United States Patent [19]
Uchida et al.

[11] Patent Number: 5,397,951
[45] Date of Patent: Mar. 14, 1995

[54] ROTOR FOR A SYNCHRONOUS ROTARY MACHINE

[75] Inventors: Hiroyuki Uchida; Takashi Okamoto, both of Minamitsuru, Japan

[73] Assignee: Fanuc Ltd., Yamanashi, Japan

[21] Appl. No.: 87,730

[22] Filed: Jul. 19, 1993

[30] Foreign Application Priority Data

Nov. 29, 1991 [JP] Japan .................. 3-316225

[51] Int. Cl.⁶ .......................................... H02K 21/12
[52] U.S. Cl. ...................... 310/156; 310/45; 310/91; 310/261
[58] Field of Search .............. 310/156, 262, 92, 264, 310/216, 265, 261, 267, 91, 214, 215, 45; 29/598

[56] References Cited

U.S. PATENT DOCUMENTS

| | | | |
|---|---|---|---|
| 4,556,809 | 12/1985 | Beisse | 310/156 |
| 4,642,502 | 2/1987 | Carpenter | 310/156 |
| 4,954,736 | 9/1990 | Kawamoto | 310/156 |
| 5,038,065 | 8/1991 | Matsubayashi | 310/156 |

FOREIGN PATENT DOCUMENTS

| | | |
|---|---|---|
| 57-52783 | 3/1982 | Japan . |
| 57-52784 | 3/1982 | Japan . |
| 61-17876 | 2/1986 | Japan . |
| 61-180579 | 11/1986 | Japan . |
| 61-202166 | 12/1986 | Japan . |
| 63-120568 | 8/1988 | Japan . |
| 63-213442 | 9/1988 | Japan . |
| 2217924A | 11/1989 | United Kingdom . |

OTHER PUBLICATIONS

Patent Abstracts of Japan, vol. 9, No. 284 (E-357) (2007), Nov. 12, 1985, & JP-A-60 125 149, Jul. 4, 1985.
Patent Abstracts of Japan, vol. 7, No. 107 (E-174) (1252), May 11, 1983, & JP-A-58 029 359, Feb. 21, 1983.
Patent Abstracts of Japan, vol. 14, No. 297 (E-945) (4240), Jun. 27, 1990, & JP-A-02 095 150, Apr. 5, 1990.

Primary Examiner—R. Skudy
Attorney, Agent, or Firm—Nikaido, Marmelstein, Murray & Oram

[57] ABSTRACT

The present invention provides a rotor for a synchronous rotary machine, having a rotor core (23) provided in its outer circumference with recesses (26), and permanent magnets (25) each fitted radially in each recess (26) so that its lower surface (25b) will be seated on the bottom surface of the recess (26). Each permanent magnet (25) and each recess (26) are formed so that gaps are formed between the inclined side surfaces (27a, 27b) of the permanent magnet (25) and the corresponding inclined side surfaces (26b, 26c) of the recess (26), and an adhesive filling up the gaps is hardened to form wedging layers (30) capable of restraining the permanent magnet (25) from being separated from the surface of the rotor core (23) by forces acting on the permanent magnet (25) to separate the permanent magnet (25) from the surface of the rotor core (23).

7 Claims, 11 Drawing Sheets

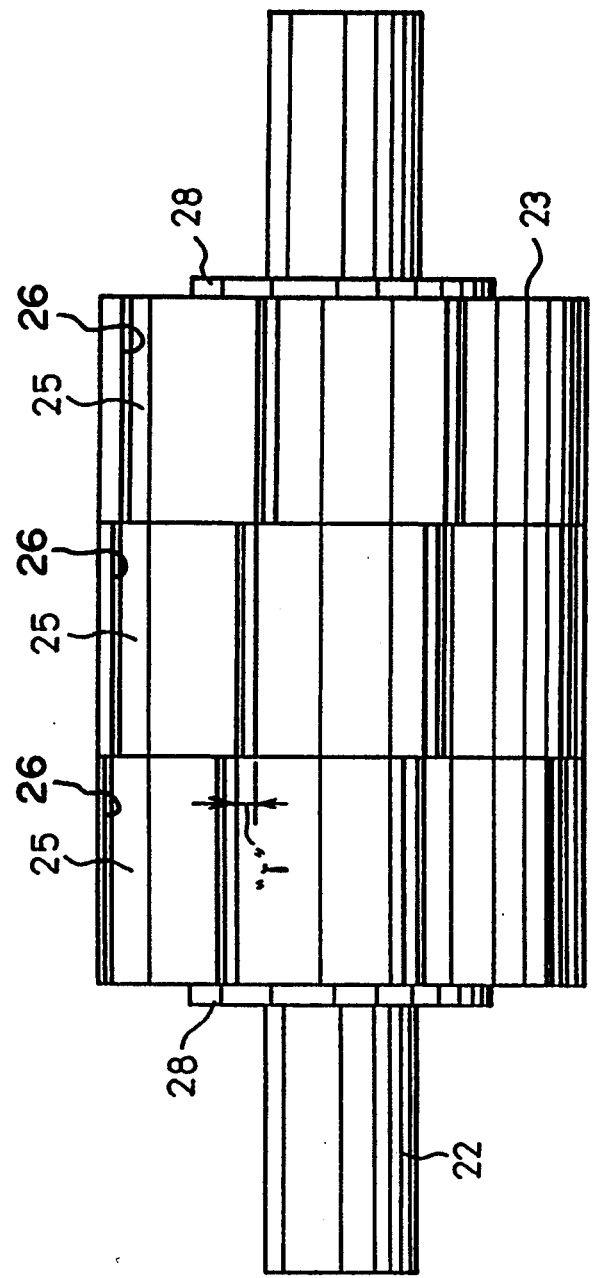

ROTOR FOR A SYNCHRONOUS ROTARY MACHINE

TECHNICAL FIELD

The present invention relates to the construction of a rotor for a synchronous rotary machine, particularly, for a synchronous electric motor, which includes a rotor core mounted on a rotatably supported shaft so as to serve as a yoke and having a substantially cylindrical circumference, and permanent magnets fixedly arranged on the circumference of the rotor core so as to interact with a rotating magnetic field created by a stator to thereby generate an output torque, the rotor further incorporating an improvement for preventing the separation of the permanent magnets from the rotor core. The present invention also relates to a method of fabricating such a rotor.

BACKGROUND ART

Most synchronous rotary machines, particularly, synchronous electric motors, employ either a radial magnet type rotor formed by alternately and contiguously arranging rotor cores serving as yokes, and permanent magnet pieces along a circumferential direction or a surface-mounted magnet type rotor formed by attaching a plurality of permanent magnet pieces on the outer circumference of a cylindrical rotor core.

The plurality of permanent magnets of the latter of these two types of rotors for synchronous rotating machines, in general, are attached adhesively with an adhesive to the substantially cylindrical circumference of the rotor core. The adhesive strength of the adhesive must exceed the resultant centrifugal force that acts on the permanent magnets when the rotor rotates and the magnetic attraction resulting from the interactions of a rotating magnetic field created by the stator and magnetic fields created by the permanent magnets to prevent the separation of the permanent magnets from the circumference of the rotor core even when the rotor rotates for a long time under the action of the centrifugal force and the magnetic attraction. Accordingly, to ensure that the permanent magnets are securely held on the rotor, the bottom portions of the permanent magnets are partly sunk in recesses formed in the outer circumference of the rotor core so that the permanent magnets are held at their side surfaces by the rotor core when adhesively attaching the permanent magnets to the outer circumference of the rotor core.

The prior art will be described hereunder with reference to the accompanying drawings.

FIGS. 9A and 9B show the construction of a typical surface-mounted magnet type rotor for a conventional synchronous electric motor, in which permanent magnets are held securely on the rotor core solely by the adhesive strength of an adhesive. FIGS. 9A and 9B are a front view and a side view, respectively, of the surface-mounted magnet type rotor. Referring to FIGS. 9A and 9B, a rotor 11 supported for rotation within a stator 10 with a gap between the outer circumference thereof and the cylindrical inner circumference of the stator 10 comprises a rotor shaft 12, a cylindrical rotor core 13 fixedly mounted on the rotor shaft 12, a plurality of permanent magnets 14 having the shape of a modified octagon attached by adhesive at their bottom surface to the outer circumference of the cylindrical rotor core 13, and end plates 15 attached respectively to the opposite ends of the rotor core 13 to hold the rotor core in place on the rotor shaft 12. As mentioned above, the permanent magnets 14 of this typical surface-mounted magnet type rotor are secured to the rotor core 13 solely by the adhesive strength of the adhesive, which is not a sufficiently effective measure to prevent the separation of the permanent magnets 14 from the rotor core 13.

FIG. 10 is a side view, corresponding to FIG. 9B, of a rotor having permanent magnets partly sunk in recesses formed in the outer circumference of a rotor core. As is obvious from the comparison of the constructions shown in FIGS. 9B and 10, the construction shown in FIG. 10 is more effective in preventing separation than the construction shown in FIG. 9B. As shown in FIG. 10, a rotor core 13 is provided in its outer circumference with axial dovetail grooves 16, and permanent magnets 14a having the shape of a curved plate and formed in a shape complementary to that of the dovetail grooves 16 and having an upper surface, a lower surface of a width greater than that of the upper surface, and side surfaces extending outward so as to approach each other and inserted in the dovetail grooves 16. When assembling the rotor core 13 and the permanent magnets 14a, the permanent magnets 14a need necessarily to be inserted axially of the rotor core 13 in the dovetail grooves 16 and positioned in place with respect to the axial direction.

Accordingly, when as shown in FIG. 11, the rotor is provided with a plurality of permanent magnets 14a divided into a plurality of groups (three groups in FIG. 11) and the groups of permanent magnets 14a are arranged respectively in a plurality of axial divisions (three axial divisions in FIG. 11) on the outer circumference of the rotor core 13 with the angular position of the permanent magnets 14a of each group shifted relative to that of the permanent magnets 14a of other groups to suppress torque ripple, it is impossible to insert the permanent magnets 14a of the middle group axially in the corresponding dovetail grooves 16 of the rotor core 13.

DISCLOSURE OF THE INVENTION

Accordingly, a principal object of the present invention is to solve the foregoing problems in the rotor of the conventional synchronous rotary machine, particularly, in the surface-mounted magnet type rotor.

Another object of the present invention is to provide a surface-mounted magnet type rotor comprising a rotor core, and permanent magnets attached substantially to the outer circumference of the rotor core, capable of being assembled by assembling processes as simple as those for assembling the conventional surface-mounted magnet type rotor without requiring additional assembling work, and having a construction having a mechanical fastening strength capable of securely holding the permanent magnets on the rotor core so that the permanent magnets are not separated from the surface of the rotor core by the centrifugal force generated by the rotation of the rotor and the magnetic attraction resulting from the magnetic interactions of the stator magnetic field created by the stator, and the permanent magnets.

A further object of the present invention is to provide a method of fabricating a surface-mounted magnet type rotor for a synchronous rotary machine, having a rotor core provided with recesses in its outer circumference, and permanent magnets fitted in the recesses of the rotor core by radially fitting the permanent magnets in the recesses of the rotor core like tiling a surface.

In view of the foregoing object of the present invention, when fabricating the surface-mounted magnet type rotor for a synchronous rotary machine, each permanent magnet is inserted radially in the recess formed in the substantially cylindrical surface of the rotor core. Each recess and each permanent magnet are formed so that wedging spaces are formed on the opposite sides of the permanent magnet between the side faces of the permanent magnet and walls demarcating the recess, and wedge-like layers of an adhesive are formed in the wedging spaces to secure the permanent magnet in place against the resultant of the centrifugal force generated by the rotation of the rotor and the magnetic attraction resulting from magnetic interactions of magnetic fields created by the stator, and the permanent magnet, that tends to separate the permanent magnet from the rotor core.

In a rotor for a synchronous rotary machine, according to the present invention comprising a substantially cylindrical rotor core supported for rotation inside a stator, and a plurality of permanent magnets attached to the surface of the rotor core, each permanent magnet is formed in a pieces of polygonal shape having flat, axially opposite end faces parallel to a plane perpendicular to the axis of rotation of the rotor, side faces each intersecting the opposite end faces, and curved upper and lower surfaces formed so as to have curvature substantially in conformity with that of the outer circumference of the cylindrical core, the lower surface having a width greater than that of the upper surface so that the side faces connecting the upper and lower surfaces are inclined so as to diverge from each other toward the lower surface, the cylindrical rotor core is provided in an outer surface thereof with a plurality of recesses substantially resembling a dovetail groove, each defined by a cylindrical bottom surface and opposite inclined side faces diverging from each other toward the bottom of the recess so that gaps are formed between the inclined side faces of the recess and the inclined side faces of the permanent magnet when the lower portion of the permanent magnet is fitted radially in the recess, and arranged at fixed angular intervals, and the gaps formed between the inclined side faces of the permanent magnet and those of the recess are filled with adhesive to form wedge-like layer of adhesive between the inclined faces of the permanent magnet and the inclined side faces of the recess, and the wedge-like layers of adhesive hold the permanent magnet firmly in the recess so that the permanent magnet will not be separated from the rotor core.

According to the present invention, a method of fabricating a rotor for a synchronous rotary machine, having a substantially cylindrical rotor core supported for rotation inside a stator, and a plurality of permanent magnets adhesively attached to the cylindrical surface of the rotor core comprises the steps of:

forming each permanent magnet in a piece of substantially polygonal shape having flat, axially opposite axial end faces parallel to a plane perpendicular to the axis of rotation of the rotor, inclined side faces each intersecting the opposite end faces, curved upper and lower surfaces having a curvature substantially in conformity with that of the outer circumference of the rotor core, the lower surface being formed so to have a width greater than that of the upper surface so that the side faces diverge from each other toward the lower surface;

forming a plurality of axial recesses, each having inclined side faces diverging from each other toward the bottom of the recess so that gaps are formed between the inclined side faces of the permanent magnet and the inclined side faces of the recess when the lower portion of the permanent magnet is inserted radially in the recess, in the surface of the rotor core at fixed angular intervals;

filling the gaps formed between the inclined side faces of each permanent magnet and the inclined side faces of each recess with adhesive; and hardening the adhesive filling the gaps to form wedge-like layers of adhesive to secure the permanent magnet to the rotor core so that the permanent magnet will not be separated from the surface of the rotor core.

BRIEF DESCRIPTION OF THE DRAWINGS

The above and other objects, features and advantages of the present invention will become more apparent from the following description taken in connection with the accompanying drawings, in which:

FIG. 8 is a front view of a rotor in a fourth embodiment according to the present invention;

BEST MODE OF CARRYING OUT THE INVENTION

Figure 1A:
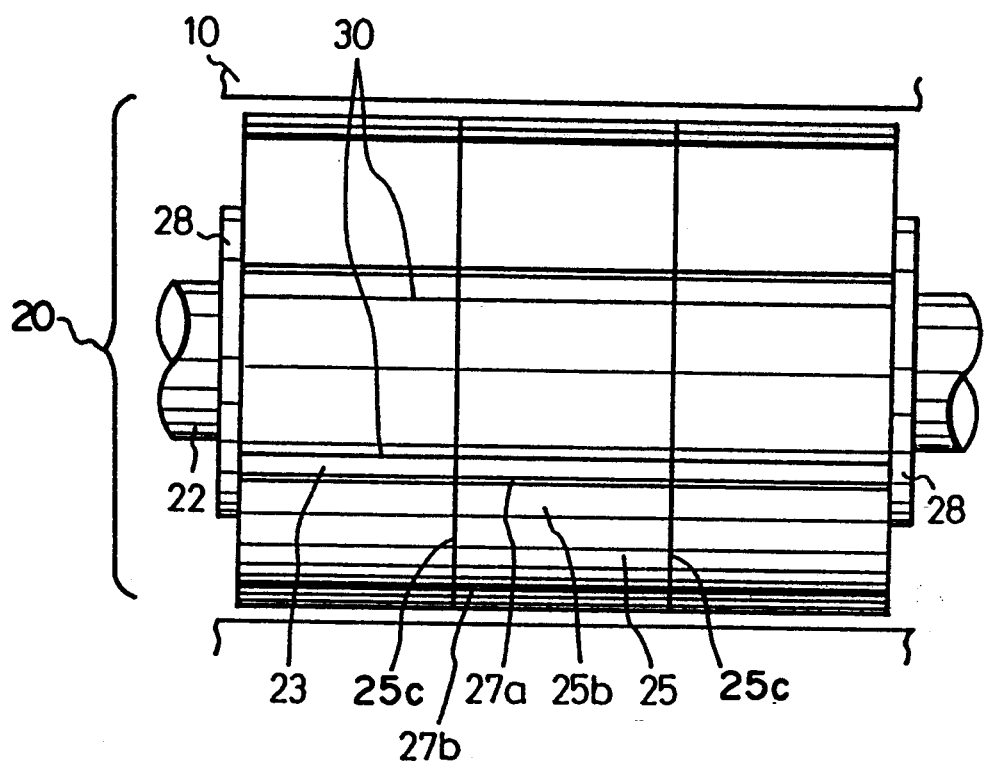
FIG. 1A is a front view of a rotor for a synchronous machine, in a first embodiment according to the present invention.
Figure 1B:
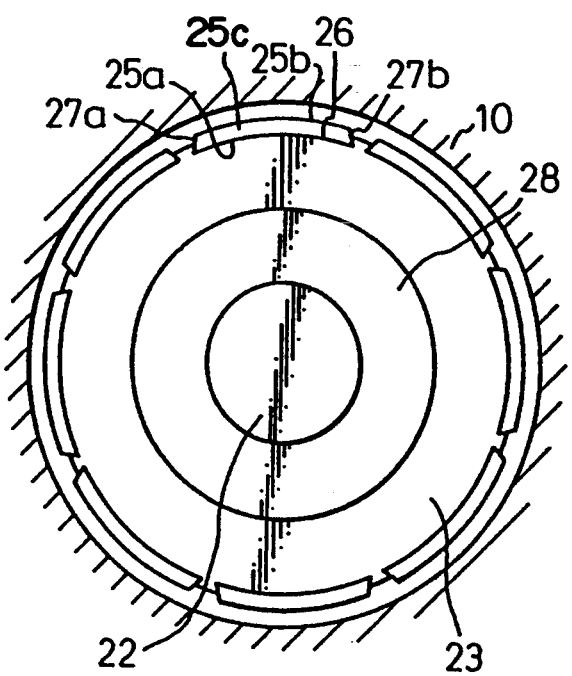
Fig. 1B is a side view of the rotor for a synchronous machine, in the first embodiment according to the present invention.

Referring to FIGS. 1A and 1B, a rotor 20 for a synchronous rotary machine, in a first embodiment according to the present invention, similarly to the conventional rotor, is a motor element supported for rotation inside a stator 10 with a gap between the outer circumference thereof and the cylindrical inner circumference of the stator 10. The rotor 20 comprises a rotor shaft 22, a substantially cylindrical rotor core 23 adhesively fixed or fastened with a wedge to the rotor shaft 22, and a plurality of permanent magnets 25 fitted respectively in recesses 26 formed in the outer circumference of the rotor core 23.

Each of the permanent magnets 25 is formed in the shape of a curved piece of plate and has a lower surface 25a curved in a curvature corresponding to that of the outer circumference of the rotor core 23, an upper surface having a radially outward convex shape determined on the basis of design conditions determined taking into consideration conditions for magnetic interactions, axially opposite end faces 25c parallel to a plane perpendicular to the axis of rotation of the rotor 20, and opposite, inclined side faces 27a and 27b diverging from each other toward the lower surface 25a so as to extend opposite to the side faces of the recess 26 with gaps therebetween, respectively. In this embodiment, the inclined side faces 27a and 27b extend perpendicularly to the opposite end faces 25c.

The rotor 20, similarly to the conventional rotor, is provided with end plates 28 attached to the axially opposite ends of the rotor core 23.

In the rotor 20, each permanent magnet 25 is attached to the rotor core 23 by adhesively joining the lower surface 25a thereof to the bottom surface of the recess 26, adhesively joining the inclined side faces 27a and 27b thereof to the side faces of the recess 26 facing thereto with an adhesive and hardening the adhesive filling up gaps between the inclined side faces 27a and 27b and the side faces of the recess 26 in wedge-like layers 30 of the adhesive. Therefore, the wedge effect of the wedge-like layers 30 of adhesive holds each permanent magnet 25 securely in a recess 26 so that each permanent magnet 25 will not be separated from the rotor core 23 by the resultant of centrifugal force that acts radially outward on the permanent magnet when the rotor 20 is rotated at a high rotating speed and radial magnetic attraction resulting from interactions of a rotating magnetic field created by the stator 10, and each permanent magnet 25. A portion of permanent magnet 25 protrudes beyond and outside the periphery of rotor core 23.

The recess 26 of the rotor core 23, the construction of each permanent magnet 25, and a procedure for assembling the permanent magnet 25 and the rotor core 23 when fabricating the rotor shown in FIGS. 1A and 1B will be described hereinafter with reference to FIG. 2.

Figure 2:
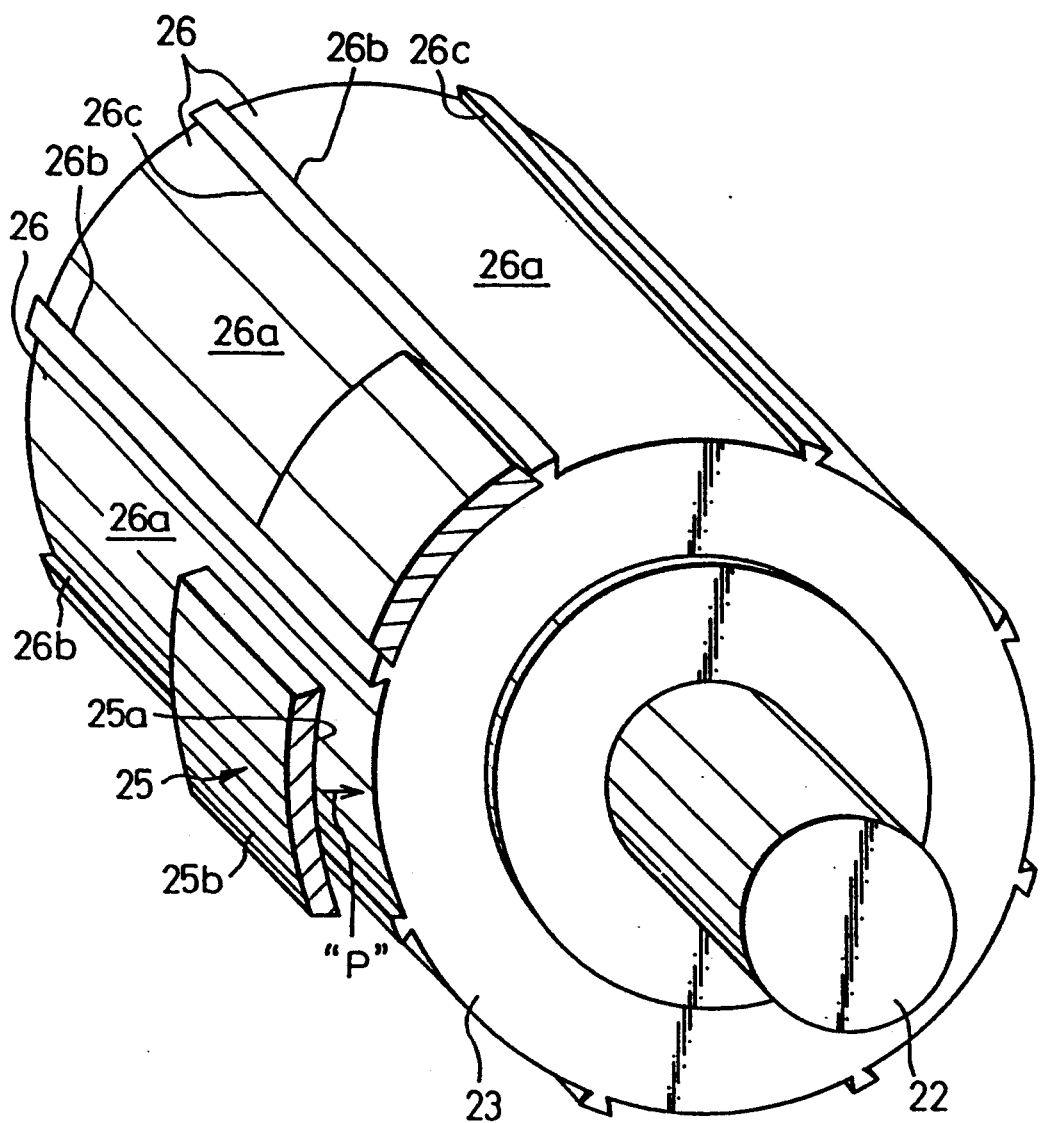
FIG. 2 is an enlarged perspective view of assistance in explaining a procedure for putting permanent magnets on a rotor core included in the rotor in the first embodiment.

Referring to FIG. 2, the plurality of recesses (eight recesses in this embodiment) 26 are extended straight in the outer circumference of the rotor core 23 along the axis of the rotor core 23 and arranged at angular intervals. Each recess 26 is a dovetail groove expanding radially inward and having a curved bottom surface 26a having the shape of an arc of a circle, and opposite, inclined side faces 26b and 26c diverging from each other radially inward. As mentioned above, the inclined side faces 26b and 26c are complementary respectively to the inclined side faces 27a and 27b of the permanent magnet 25, and the inclined side faces are the opposite side faces of a dovetail groove that enables the permanent magnet 25 to be advanced radially toward the bottom surface 26a of the recess 26 of the rotor core 23 as indicated by the arrow P in FIG. 2 when fitting the permanent magnet 25 in the recess 26 and forms minute gaps between the inclined side faces 27a and 27b of the permanent magnet 25 and the corresponding inclined side faces 26b and 26c of the recess 26 to enable the permanent magnet 25 to be removed from the recess 26 when the permanent magnet 25 is pulled radially outward in a direction opposite the direction of the arrow P. When fitting the permanent magnet 25 in the recess 26, the lower surface 25a and the inclined side faces 27a and 27b thereof are coated with an adhesive. When the permanent magnet 25 is seated on the bottom surface 26a of the recess 26, the minute gaps are substantially fully filled up with the adhesive. The adhesive filling the minute gaps is hardened to form the wedge-like layers 30.

Figure 3A:
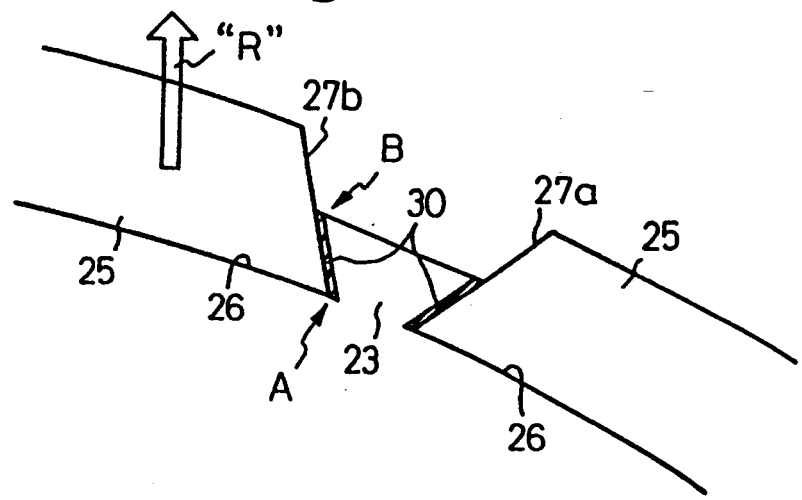
FIG. 3A is a fragmentary sectional view of an essential portion of the rotor in the first embodiment, showing the relation between a recess formed in the rotor core, a permanent magnet and wedging layer of an adhesive on the rotor in the first embodiment.

As shown in FIG. 3A, since the minute gaps between the inclined side faces 27a and 27b of the permanent magnet 25 and the corresponding inclined side faces 26b and 26c of the recess 26 of the rotor core 23 are filled up respectively with the wedge-like layers 30 of the hardened adhesive, the strong, mechanical wedging effects of the wedge-like layers 30 make impossible the removal of the permanent magnet 25 from the recess 26 even if a force tending to separate the permanent magnet 25 from the rotor core 23 acts in the direction of the arrow R opposite the direction of the arrow P, unless the wedge-like layers 30 are crushed. It is preferable to design the dimensional relation between the permanent magnet 25 and the recess 26 so that the distance between the edges A along which the inclined side faces 27a and 27b of the permanent magnet 25 intersect the lower surface 25a of the same, respectively, is slightly smaller than the distance between the edges B of the recess 26, and the edges A of the permanent magnet 25 graze the edges B of the recess 26 when the wedge-like layers 30 are not formed and permanent magnet 25 is pulled in the direction of the arrow R. When the permanent magnet 25 and the recess 26 are formed so as to meet such a dimensional relation, the wedge-like layers 30 exert the wedging effect on the permanent magnet 25 even if a large separating force resulting from the centrifugal force generated by the rotation of the rotor and the magnetic attraction acts on the permanent magnet and a large compressive force acts accordingly on the wedge-like layers 30 of adhesive, unless the wedge-like layers 30 are crushed completely and pushed completely out of the gaps. Thus, the wedging effect of the wedge-like layers 30 restrains the permanent magnet from being separated from the rotor core 23.

Figure 3B:
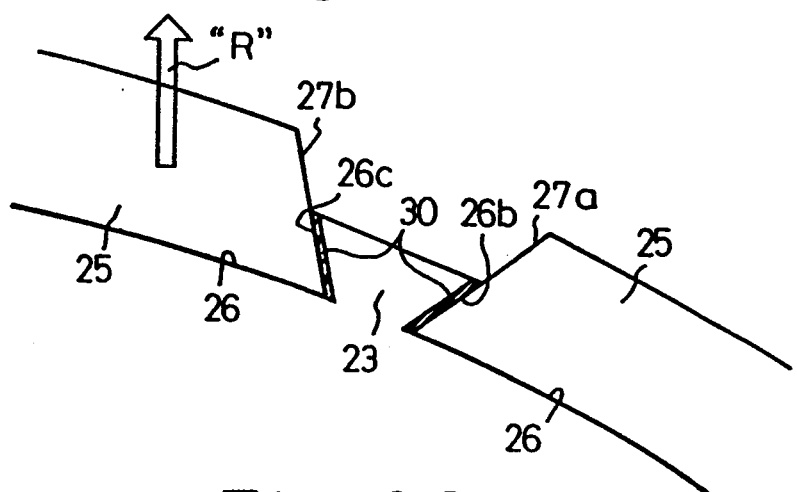
FIG. 3B is a fragmentary sectional view of an essential portion of a modification of the rotor in the first embodiment.

In a modification shown in FIG. 3B, the inclination of the inclined side faces 27a and 27b of the permanent magnet 25 and the inclination of the corresponding inclined side faces 26b and 26c of the recess 26 of the rotor core 23 are greater than those of the permanent magnet 25 and the recess 26 shown in FIG. 3A to enhance the wedging effect of the wedge-like layers 30 of the adhesive.

Figure 3C:
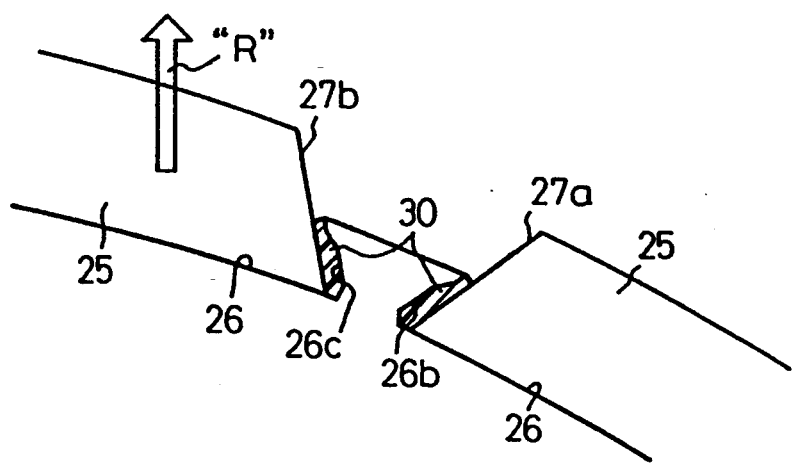
FIG. 3C is a fragmentary sectional view of an essential portion of another modification of the rotor in the first embodiment.

In another modification shown in FIG. 3C, the wedging effect of the wedge-like layers 30 of the adhesive on restraining the permanent magnet 25 from being separated from the rotor core 23 is enhanced by partially recessing the inclined side faces 26b and 26c of the recess 26 of the rotor core 23 to increase the thickness of the wedge-like layers 30 of the adhesive.

Figure 4A:
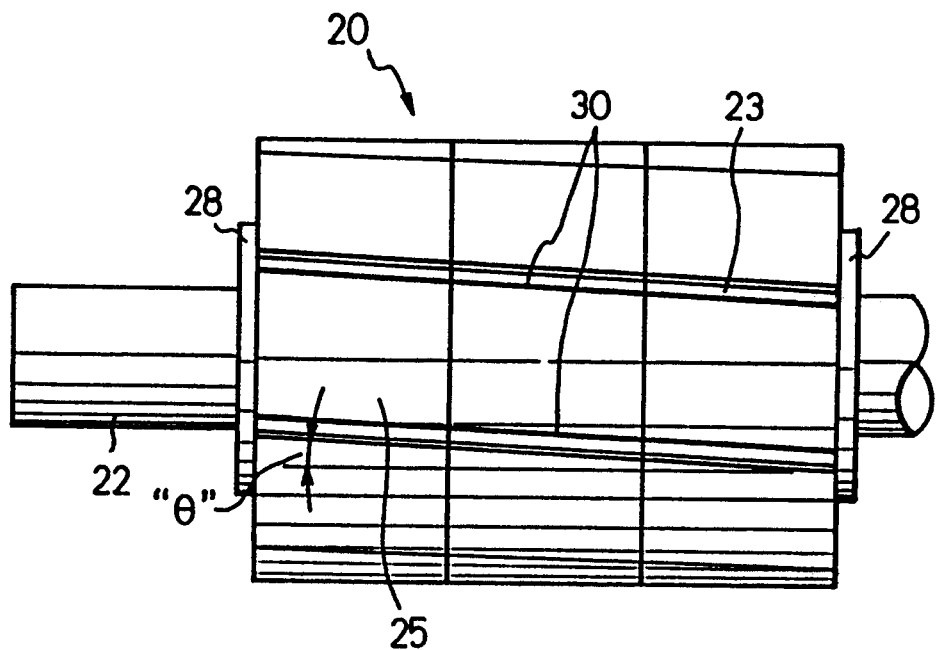
FIG. 4A is a front view of a rotor for a synchronous machine, in a second embodiment according to the present invention.
Figure 4B:
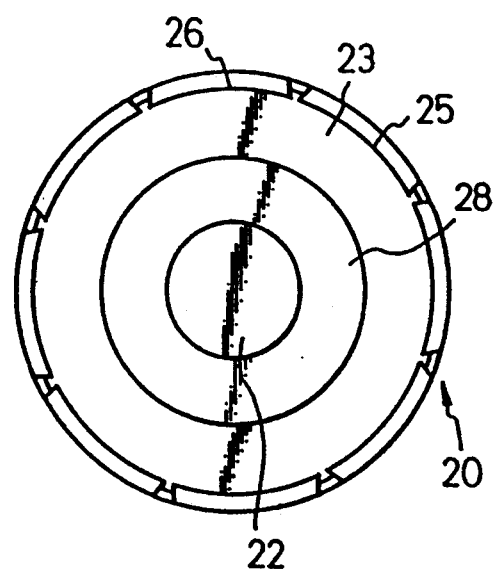
FIG. 4B is a side view of the rotor for synchronous machine, in the second embodiment.

FIGS. 4A and 4B show shows a rotor 20 for a synchronous rotary machine, in a second embodiment according to the present invention. The rotor 20 in the second embodiment differs from the rotor 20 in the first embodiment in that recesses 26 are formed in the circumference of a rotor core 23 so as to extend at a fixed helix angle $\theta$. However, the rotor 20 in the second embodiment is similar to the rotor 20 in the first embodiment in that the recesses 26 are formed substantially straight along the axis of rotation in the outer circumference of the rotor core 23, the recesses 26 are arranged at angular intervals, and the recesses 26 have the shape of a dovetail groove expanding radially inward. The opposite, inclined side faces 27a and 27b of each permanent magnet 25 to be radially fitted in the recesses 26 like tiling a surface are formed so as to extend at a helix angle $\theta$. Naturally, the inclined side faces 27a and 27b, similarly to those of the first embodiment, are coated with an adhesive, and wedge-like layers 30 are formed to secure the permanent magnet 25 firmly in the recess 26 to restrain the permanent magnet 25 from being separated from the rotor core 23.

In the second embodiment, as is generally known, the permanent magnets 25 are arranged on the rotor core 23 in an axially skew arrangement skewing at a helix angle $\theta$ to the axis of the rotor core 23 to suppress torque ripple attributable to slots formed in the inner circumference of the stator 10 to hold coils therein. In assembling this surface-mounted magnet type rotor 20, the permanent magnets 25 can be radially fitted in the recesses 26 like tiling a surface. The wedging layers 30 formed by filling up the gaps between the inclined side faces of the permanent magnets 25 and the inclined side faces of the recesses 26 and hardening the adhesive filling up the gaps, similarly to those of the first embodiment, hold the permanent magnets 25 in the recesses 26 so that the permanent magnets 25 will not be separated from the rotor core 23.

Figure 5:
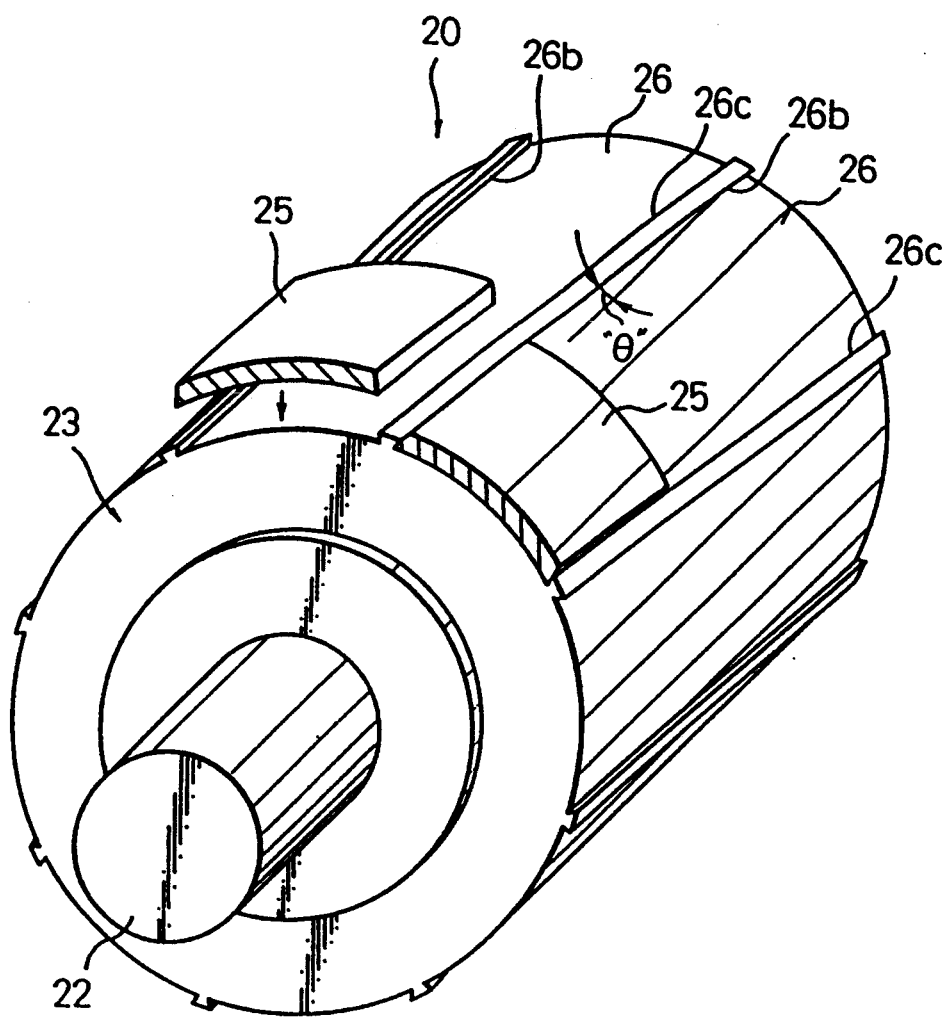
FIG. 5 is an enlarged perspective view of assistance in explaining a procedure for putting a permanent magnet on a rotor core included in the rotor in the second embodiment.

FIG. 5 is a perspective view of the rotor core 23 provided with the recesses 26 skewed at a helix angle $\theta$ to the axis of rotation of the rotor core 23.

Figure 6A:
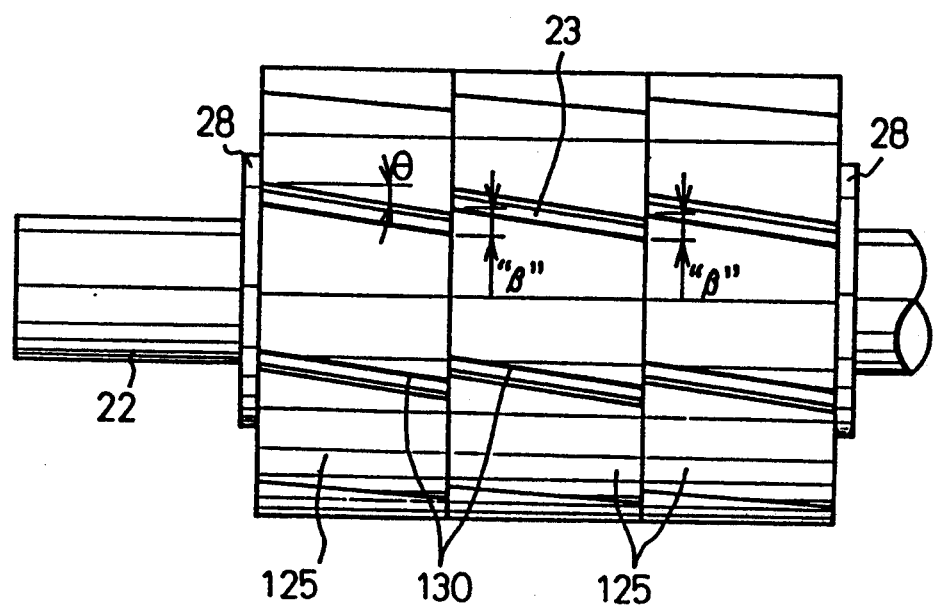
FIG. 6A is a front view of a rotor for a synchronous rotating machine, in a third embodiment according to the present invention.
Figure 6B:
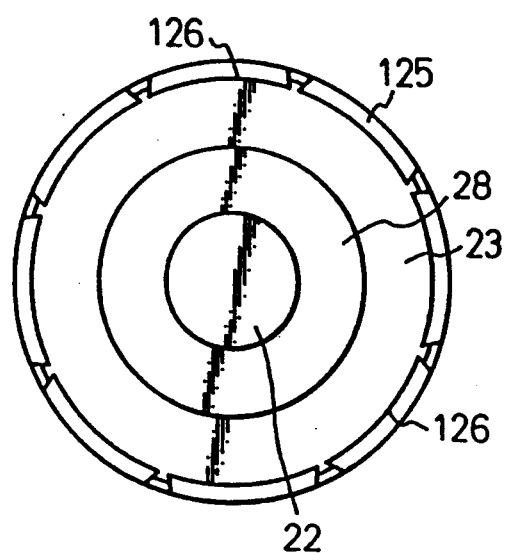
FIG. 6B is a side view of the rotor in the third embodiment.
Figure 7:
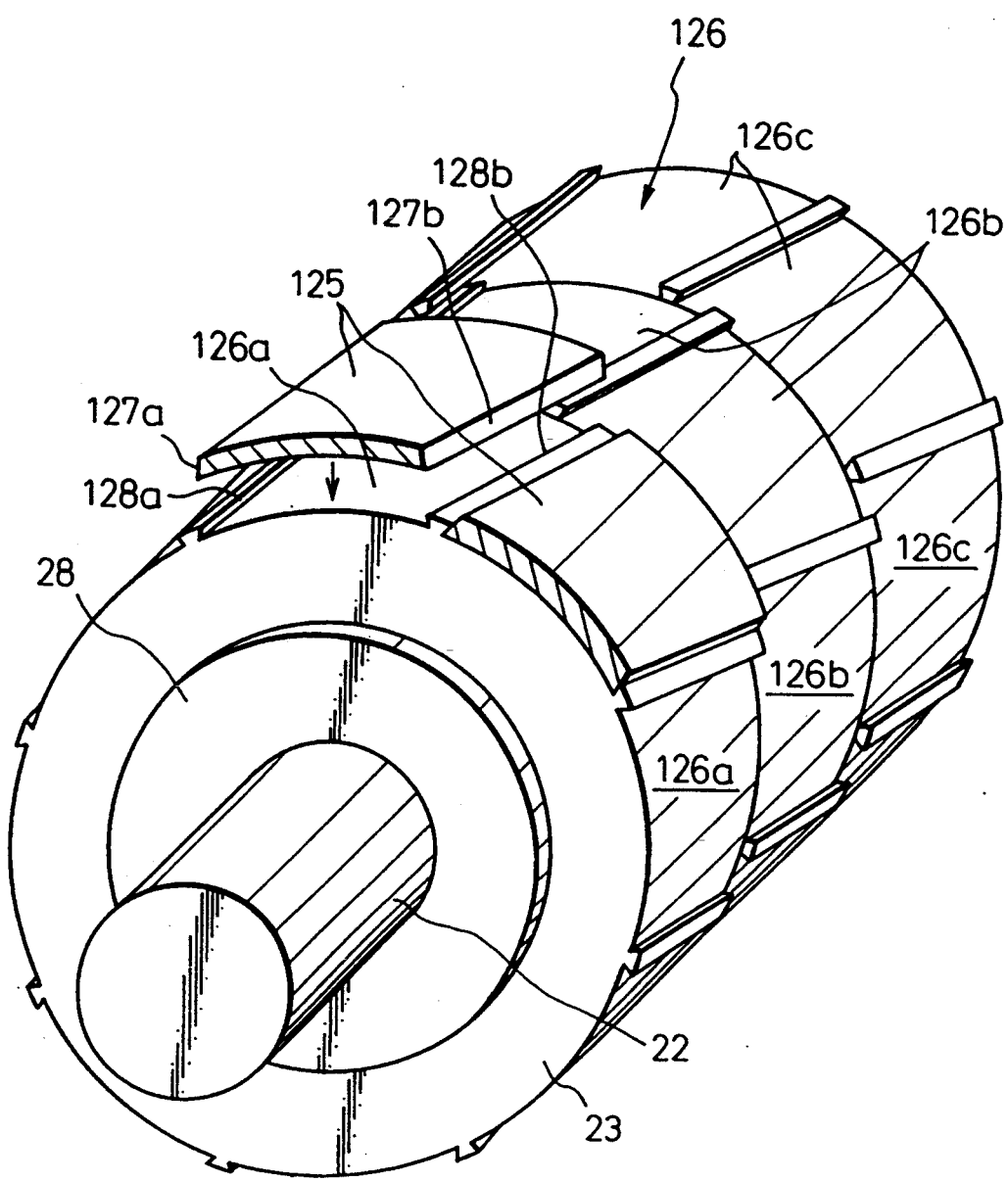
FIG. 7 is an enlarged perspective view of assistance in explaining a procedure for putting a permanent magnet of a rotor core included in the rotor in the third embodiment.
Figure 9A:
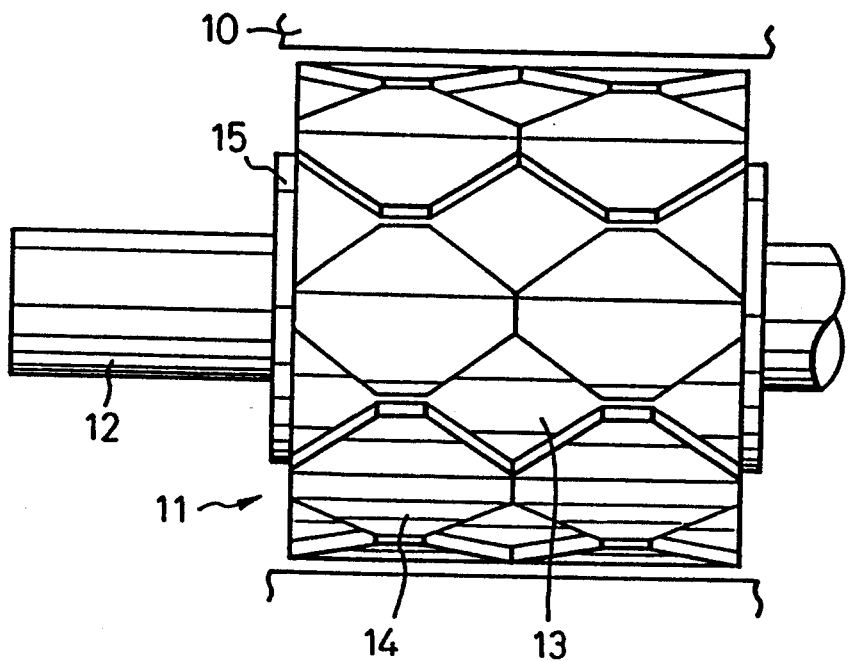
FIG. 9A is a front view of a conventional surface-mounted magnet type for a synchronous rotating machine.
Figure 9B:
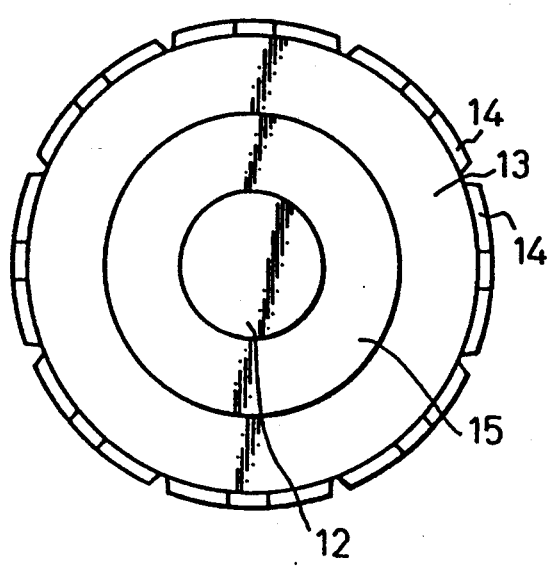
FIG. 9B is a side view of the rotor of FIG. 9A.
Figure 10:
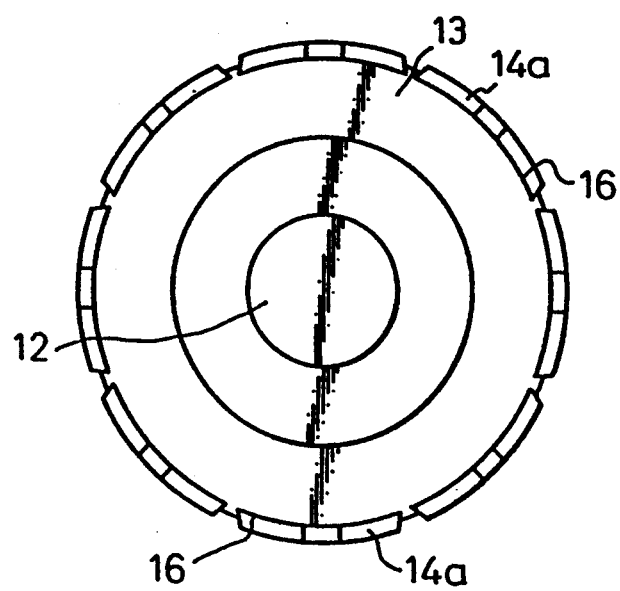
FIG. 10 is a side view of another conventional surface-mounted magnet type rotor for a synchronous rotating machine.
Figure 11:
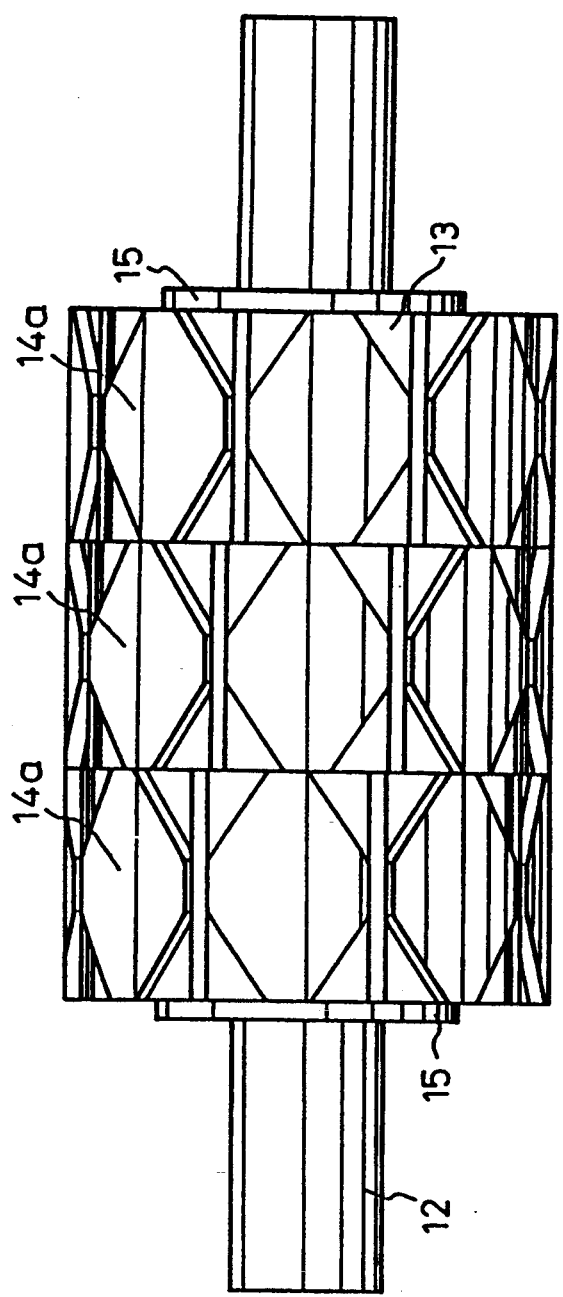
FIG. 11 is a front view of a third conventional surface-mounted magnet type rotor for a synchronous rotating machine.

FIGS. 6A, 6B and 7 show a rotor for a synchronous rotary machine, in a third embodiment according to the present invention.

As shown in FIGS. 6A, 6B and 7, recesses 126 are formed in a plurality of axial recess divisions (three recess divisions in this embodiment) 126a to 126c of a short axial length. The recesses 126 in each of the recess divisions 126a, 126b and 126c, similarly to the recesses in the second embodiment, are arranged in a skew arrangement skewing at a helix angle $\theta$ to the axis of rotation of the rotor 20 and have the shape of a dovetail groove. However, the phase angles of the respective recesses 126 of the adjacent recess groups, i.e., the recess division 126a and 126b, and the recess divisions 126b and 126c, have a fixed phase angle difference $\beta$ to provide permanent magnets 125 fitted in the respective recesses of the recess divisions 126a, 126b and 126c, with a torque ripple suppressing effect. Naturally, as is generally known, the phase angle difference $\beta$ is determined taking into consideration the degree of the torque ripple included in the torque produced by the magnetic interaction of a rotating magnetic field created by the stator and the permanent magnets 125.

As shown in FIG. 7, when assembling the permanent magnets 125 and the rotor core 23, the permanent magnets 125 can be radially fitted in the recesses 126 of the recess divisions 126a, 126b and 126c like tiling a surface. Accordingly, the permanent magnets 125 can be radially fitted in the recesses 126 of the recess divisions 126a, 126b and 126c in the direction of the arrow P like tiling a surface even though the phases of the respective recesses 126 of the adjacent recess 126a, 126b and 126c are shifted relative to each other by the phase angle difference $\beta$, which is impossible in assembling the conventional rotor in which the permanent magnets are inserted axially in the recesses.

Naturally, the adhesive filling up gaps between the inclined side faces 127a and 127b of each permanent magnet 125 and the corresponding inclined side faces 128a and 128b of each of the recesses 126 of the recess divisions 126a to 126c forms wedge-like layers 130 (FIG. 6A) when hardened, and the strong wedging function of the wedge-like layers 130 restrains the permanent magnets 125 from being separated from the rotor core 23 by the centrifugal force generated by the rotation of the rotor 20 and the magnetic attraction.

The effect of the arrangement of the permanent magnets 125 in the third embodiment, in which the phase of the recesses 126 of each of the recess divisions 126a, 126b and 126c are shifted by the phase angle difference $\beta$ relative to that of the recesses 126 of the adjacent recess divisions, on the suppression of torque ripple can be produced, for example, by dividing the axial recesses 26 of the rotor core 23 in the first embodiment into sectional axial recesses, dividing the sectional axial recesses into a plurality of axial recess divisions and shifting the phase of the sectional axial recesses of each of the plurality of axial recess divisions relative to that of the sectional axial recesses of the adjacent axial recess divisions by a phase angle difference $\gamma$. A rotor provided with permanent magnets arranged in such an arrangement is shown in FIG. 8.

In an embodiment shown in FIG. 8, axial recesses 26 are divided into sectional axial recesses of the three axial recess divisions, and the phase of the sectional axial recesses of each axial recess division is shifted by a phase angle difference $\gamma$ relative to that of the sectional axial recess of the adjacent axial recess divisions. Although the sectional axial recesses 26 are shifted relative to each other with respect to the circumferential direction, naturally, the permanent magnets 25 can be radially fitted in the sectional axial recesses 26 like tiling a surface similarly to those of the foregoing embodiments.

The permanent magnets employed in the foregoing embodiments have quadrilateral shapes, respectively, in a plan view. It will be easily understood by a person with ordinary skill in the art to which the present invention pertains that the permanent magnets may be of any suitable polygonal shape, such as the octagonal permanent magnets employed in the conventional rotor for a synchronous motor, provided that each permanent magnet has side surfaces that are able to form spaces for forming wedge-like layers therein by filling up the spaces with an adhesive and hardening the adhesive filling up the spaces together with the corresponding side faces of a recess when the permanent magnet is fitted radially in the recess like tiling a surface. Accordingly, permanent magnets applicable to the rotor of the present invention are not limited to the foregoing quadrilateral permanent magnets.

As is apparent from the description of the foregoing embodiments, according to the present invention, a rotor for a synchronous rotary machine, particularly, a surface-mounted magnet type rotor comprising a substantially cylindrical rotor core and permanent magnets attached to the outer circumference of the rotor core, has a construction that enables the assembly of the rotor core and the permanent magnets by radially fitting the permanent magnets in recesses resembling a dovetail groove like tiling a surface, and wedge-like layers of adhesive formed by filling up spaces formed between the side faces of the permanent magnet and the corresponding side faces of the recess and hardening the adhesive filling up the spaces, restrains the permanent magnets from being separated from the rotor core by the centrifugal force generated by the rotation of the rotor and the magnetic attraction, highly effectively. Thus, the construction of the rotor of the present invention enhances the mechanical permanent magnet anchoring force against the force tending to separate the surface-mounted permanent magnets from the rotor core remarkably and the life and reliability of the synchronous rotary machine incorporating the rotor of the present invention are improved accordingly.

Furthermore, even if the permanent magnets of the rotor are arranged in a skew arrangement or in an offset arrangement, in which the phase of the permanent magnets fitted in the recesses of one of a plurality of recess divisions is shifted relative to that of the permanent magnets fitted in the recesses of the adjacent recess divisions, on the outer circumference of the rotor core of the rotor, the permanent magnets can be attached to the outer circumference of the rotor core by radially fitting the permanent magnets in the recesses when assembling the rotor. Thus, the rotor of the present invention can be assembled by a rotor assembling method that does not require any work in addition to that required by the rotor assembling method for assembling the conventional surface-mounted magnet type rotor and is rather simpler than the rotor assembling method for assembling the conventional surface-mounted magnet type rotor.

Although the invention has been described in its preferred forms, it will be understood by a person with ordinary skill in the art to which the present invention pertains that various modifications and variation will occur without departing from the scope of technical concept of the present invention.

We claim:

1. A rotor for a synchronous rotary machine, supported for a rotation inside a stator and provided with a substantially cylindrical rotor core having an outer circumference thereof to which a plurality of permanent magnet pieces are fixedly attached, wherein:

each of said permanent magnet pieces comprising a polygonal shape piece having flat, axially opposite end faces parallel to a plane perpendicular to an axis of rotation of said rotor, side faces each intersecting the opposite end faces, curved upper and lower surfaces formed so as to have a curvature substantially in conformity with that of said outer circumference of said cylindrical rotor core, said lower surface having a width greater than that of said upper surface so that said side faces connecting said upper and lower surfaces are inclined so as to diverge from each other toward said lower surface;

said cylindrical rotor core is provided with a surface thereof formed with a plurality of substantially dovetail-groove-like recesses each having an axially and cylindrically extending bottom surface and opposite inclined side faces diverging from each other toward said bottom surface so that gaps are formed between said inclined side faces of each recess and said inclined side faces of said plurality of permanent magnet pieces when said lower surface of each of said permanent magnet pieces is radially fitted in a corresponding recess, such that a portion of said permanent magnet pieces protrude beyond an outer periphery of said rotor core, said plurality of dovetail-groove-like recesses being circumferentially arranged at predetermined angular intervals;

said gaps formed between said inclined side faces of each of said permanent magnet pieces and said inclined side faces of said each recess are supplied with adhesive material to form wedge-like layers of said adhesive material between said inclined side faces of said permanent magnet pieces and said inclined side faces of each recess, said wedge-like layers of said adhesive firmly holding each permanent magnet piece in corresponding recesses to thereby prevent said permanent magnet pieces from being separated from said rotor core, and wherein each of said dovetail-groove-like recesses of said rotor core is a straight groove extending at a diagonal angle with respect to the axis of rotation of said rotor, and wherein a plurality of said permanent magnet pieces are disposed in said each diagonally extending straight groove.

2. A rotor for a synchronous rotary machine, supported for a rotation inside a stator and provided with a substantially cylindrical rotor core having an outer circumference thereof to which a plurality of permanent magnet pieces are fixedly attached, wherein:

each of said permanent magnet pieces comprising a polygonal shape piece having flat, axially Opposite end faces parallel to a plane perpendicular to an axis of rotation of said rotor, side faces each intersecting the opposite end faces, curved upper and lower surfaces formed so as to have a curvature substantially in conformity with that of said outer circumference of said cylindrical rotor core, said lower surface having a width greater than that of said upper surface so that said side faces connecting said upper and lower surfaces are inclined so as to diverge from each other toward said lower surface;

said cylindrical rotor core is provided with a surface thereof formed with a plurality of substantially dovetail-groove-like recesses each having an axially and cylindrically extending bottom surface and opposite inclined side faces diverging from each other toward said bottom surface so that gaps are formed between said inclined side faces of each recess and said inclined side faces of said plurality of permanent magnet pieces when said lower surface of each of said permanent magnet pieces is radially fitted in a corresponding recess, such that a portion of said permanent magnet pieces protrude beyond an outer periphery of said rotor core, said plurality of dovetail-groove-like recesses being circumferentially arranged at predetermined angular intervals;

said gaps formed between said inclined side faces of each of said permanent magnet pieces and said inclined side faces of said each recess are supplied with adhesive material to form wedge-like layers of said adhesive material between said inclined side faces of said permanent magnet pieces and said inclined side faces of each recess, said wedge-like layers of said adhesive firmly holding each permanent magnet piece in corresponding recesses to thereby prevent said permanent magnet pieces from being separated from said rotor core, wherein each of said plurality of dovetail-groove-like recesses of said rotor core includes a plurality of divided straight recesses, each having a predetermined length extending at a predetermined diagonal angle with respect to the axis of rotation of said rotor, said plurality of divided straight recesses being circumferentially shifted relative to each other by a predetermined angle, and wherein a plurality of said permanent magnet pieces are disposed respectively in said plurality of divided straight recesses of each said dovetail-groove-like recess.

3. A rotor for a synchronous rotary machine, supported for a rotation inside a stator and provided with a substantially cylindrical rotor core having an outer circumference thereof to which a plurality of permanent magnet pieces are fixedly attached, wherein:

each of said permanent magnet pieces comprising a polygonal shape piece having flat, axially opposite end faces parallel to a plane perpendicular to an axis of rotation of said rotor, side faces each intersecting the opposite end faces, curved upper and lower surfaces formed so as to have a curvature substantially in conformity with that of said outer circumference of said cylindrical rotor core, said lower surface having a width greater than that of said upper surface so that said side faces connecting said upper and lower surfaces are inclined so as to diverge from each other toward said lower surface;

said cylindrical rotor core is provided with a surface thereof formed with a plurality of substantially dovetail-groove-like recesses each having an axially and cylindrically extending bottom surface and opposite inclined side faces diverging from each other toward said bottom surface so that gaps are formed between said inclined side faces of each recess and said inclined side faces of said plurality of permanent magnet pieces when said lower surface of each of said permanent magnet pieces is radially fitted in a corresponding recess, such that a portion of said permanent magnet pieces protrude beyond an outer periphery of said rotor core, said plurality of dovetail-groove-like recesses being circumferentially arranged at predetermined angular intervals;

said gaps formed between said inclined side faces of each of said permanent magnet pieces and said inclined side faces of said each recess are supplied with adhesive material to form wedge-like layers of said adhesive material between said inclined side faces of said permanent magnet pieces and said inclined side faces of each recess, said wedge-like layers of said adhesive firmly holding each permanent magnet piece in corresponding recesses to thereby prevent said permanent magnet pieces from being separated from said rotor core, wherein each of said plurality of dovetail-groove-like recesses of said rotor core includes a plurality of divided straight recesses having a predetermined length extending in parallel to the axis of rotation of said rotor, said plurality of divided straight recesses being circumferentially shifted relative to each other by a predetermined angle, and wherein a plurality of the permanent magnet pieces are disposed respectively in said plurality of divided straight recesses of each said dovetail-groove-like recess.

4. A method of fabricating a rotor for a synchronous rotary machine, rotatably arranged inside a stator and provided with a substantially cylindrical rotor core having an outer circumference thereof to which a plurality of permanent magnet pieces are fixedly attached, said method comprising the steps of:

forming each of said permanent magnet pieces in a substantially polygonal plate having flat, axially opposite end faces parallel to a plane perpendicular to an axis of rotation of said rotor, side faces each intersecting said opposite end faces, curved upper and lower surfaces having a curvature substantially in conformity with that of said outer circumference of said cylindrical rotor core, each of said lower surfaces being formed to have a width greater than each of said upper surfaces, wherein side faces connecting an upper and a lower surface is inclined so as to diverge from each other toward said lower surface;

forming a plurality of dovetail-groove-like axial recesses in said outer circumference of said rotor core at a predetermined circumferential angular interval, each of said dovetail-groove-like axial recesses comprising a straight groove extending at a diagonal angle with respect to the axis of rotation of said rotor and having a cylindrical bottom surface and opposite inclined side surfaces diverging from each other toward said bottom surface so as to provide gaps between said inclined side surfaces of said recess and corresponding inclined side faces of each permanent magnet piece when a permanent magnet piece is disposed in a corresponding recess in such a manner that a lower surface thereof is radially fitted in said recess from outside, and such that a portion of said permanent magnet piece protrudes beyond said rotor core;

injecting adhesive into said gaps formed between said inclined side surfaces of each recess and said corresponding inclined side faces of said permanent magnet piece after radially fitting said permanent magnet piece in said recess of said rotor core to fill said gaps with said adhesive; and hardening said adhesive filling said gaps to form wedge-like layers capable of restraining said each permanent magnet piece from being separated from said outer circumference of said rotor core.

5. A method of fabricating a rotor for a synchronous rotary machine, according to claim 6, wherein said lower surface of each permanent magnet piece is coated with adhesive to form a film-like layer of adhesive between said lower surface of said each permanent magnet piece and said bottom surface of said recess of said rotor core, and said film like layer of adhesive is hardened to form a hard adhesive layer between said lower surface of said each permanent magnet piece and said bottom surface of said recess.

6. A method of fabricating a rotor for a synchronous rotary machine, rotatably arranged inside a stator and provided with a substantially cylindrical rotor core having an outer circumference thereof to which a plurality of permanent magnet pieces are fixedly attached, said method comprising the steps of:

forming each of said permanent magnet pieces in a substantially polygonal plate having flat, axially opposite end faces parallel to a plane perpendicular to an axis of rotation of said rotor, side faces each intersecting said opposite end faces, curved upper and lower surfaces having a curvature substantially in conformity with that of said outer circumference of said cylindrical rotor core, each of said lower surfaces being formed to have a width greater than each of said upper surfaces, wherein side faces connecting an upper and a lower surface is inclined so as to diverge from each other toward said lower surface;

forming a plurality of dovetail-groove-like axial recesses in said outer circumference of said rotor core at a predetermined circumferential angular interval, each of said dovetail-groove-like axial recesses of said rotor core including a plurality of divided straight recesses, each having a predetermined length extending at a predetermined diagonal angle with respect to the axis of rotation of said rotor, said plurality of divided straight recesses being circumferentially shifted relative to each other by a predetermined angle, each of said plurality of divided straight recesses having a cylindrical bottom surface and opposite inclined side surfaces diverging from each other toward said bottom surface so as to provide gaps between said inclined side surfaces of said recess and corresponding inclined side faces of each permanent magnet piece when a permanent magnet piece is disposed in a corresponding recess in such a manner that a lower surface thereof is radially fitted in said recess from outside, and such that a portion of said permanent magnet piece protrudes beyond said rotor core;

injecting adhesive into said gaps formed between said inclined side surfaces of each recess and said corresponding inclined side faces of said permanent magnet piece after radially fitting said permanent magnet piece in said recess of said rotor core to fill said gaps with said adhesive; and hardening said adhesive filling said gaps to form wedge-like layers capable of restraining said each permanent magnet piece from being separated from said outer circumference of said rotor core.

7. A method of fabricating a rotor for a synchronous rotary machine, rotatably arranged inside a stator and provided with a substantially cylindrical rotor core having an outer circumference thereof to which a plurality of permanent magnet pieces are fixedly attached, said method comprising the steps of:

forming each of said permanent magnet pieces in a substantially polygonal plate having flat, axially opposite end faces parallel to a plane perpendicular to an axis of rotation of said rotor, side faces each intersecting said opposite end faces, curved upper and lower surfaces having a curvature substantially in conformity with that of said outer circumference of said cylindrical rotor core, each of said lower surfaces being formed to have a width greater than each of said upper surfaces, wherein side faces connecting an upper and a lower surface is inclined so as to diverge from each other toward said lower surface;

forming a plurality of dovetail-groove-like axial recesses in said outer circumference of said rotor core at a predetermined circumferential angular interval, each of said dovetail-groove-like axial recesses of said rotor core including a plurality of divided straight recesses having a predetermined length extending in parallel to the axis of rotation of the rotor, said plurality of divided straight recesses being circumferentially shifted relative to each other by a predetermined angle, each of said recesses having a cylindrical bottom surface and opposite inclined side surfaces diverging from each other toward said bottom surface so as to provide gaps between said inclined side surfaces of said recess and corresponding inclined side faces of each permanent magnet piece when a permanent magnet piece is disposed in a corresponding recess in such a manner that a lower surface thereof is radially fitted in said recess from outside, and such that a portion of said permanent magnet piece protrudes beyond an outer periphery of said rotor core;

injecting adhesive into said gaps formed between said inclined side surfaces of each recess and said corresponding inclined side faces of said permanent magnet piece after radially fitting said permanent magnet piece in said recess of said rotor core to fill said gaps with said adhesive; and hardening said adhesive filling said gaps to form wedge-like layers capable of restraining said each permanent magnet piece from being separated from said outer circumference of said rotor core.

* * * * *

UNITED STATES PATENT AND TRADEMARK OFFICE
CERTIFICATE OF CORRECTION

PATENT NO. : 5,397,951
DATED     : March 14, 1995
INVENTOR(S) : Hiroyuki UCHIDA et al It is certified that error appears in the above-indentified patent and that said Letters Patent is hereby corrected as shown below:

On the Title Page, Item [22], change "Filed: July 19, 1993" to -- PCT Filed: October 21, 1992 --.

On the Title Page, after Item [22], insert the following:

[86] PCT No.:        PCT/JP/92/01368   10/21/92
     § 371 Date:     Jul. 19, 1993
     § 102(e) Date:  Jul. 19, 1993
[87] PCT Pub. No.:   WO 93/11596
     PCT Pub. Date:  Jun. 10, 1993

Signed and Sealed this

Twenty-fifth Day of July, 1995

BRUCE LEHMAN

*Attest:*

*Attesting Officer*     *Commissioner of Patents and Trademarks*